(12) United States Patent
Roux

(10) Patent No.: US 7,279,110 B2
(45) Date of Patent: Oct. 9, 2007

(54) METHOD AND APPARATUS FOR CREATING A PHASE STEP IN MIRRORS USED IN SPATIAL LIGHT MODULATOR ARRAYS

(75) Inventor: Stephen Roux, New Fairfield, CT (US)

(73) Assignee: ASML Holding N.V., Veldhoven (NL)

( * ) Notice: Subject to any disclaimer, the term of this patent is extended or adjusted under 35 U.S.C. 154(b) by 256 days.

(21) Appl. No.: 11/020,138

(22) Filed: Dec. 27, 2004

(65) Prior Publication Data

US 2006/0139729 A1    Jun. 29, 2006

(51) Int. Cl.
    B29D 11/00    (2006.01)
(52) U.S. Cl. .............. 216/24; 216/2; 216/17; 216/19; 216/41; 216/58; 216/66
(58) Field of Classification Search .......... 216/2, 216/24, 41, 58, 17, 66, 19
    See application file for complete search history.

(56) References Cited

U.S. PATENT DOCUMENTS

| | | | |
|---|---|---|---|
| 4,659,429 A * | 4/1987 | Isaacson et al. .......... 216/24 |
| 4,957,592 A * | 9/1990 | O'Neill .................. 216/2 |
| 4,961,821 A * | 10/1990 | Drake et al. ............ 438/21 |
| 5,229,872 A | 7/1993 | Mumola | |
| 5,296,891 A | 3/1994 | Vogt et al. | |
| 5,500,736 A | 3/1996 | Koitabashi et al. | |
| 5,523,193 A | 6/1996 | Nelson | |
| 5,530,482 A | 6/1996 | Gove et al. | |
| 5,579,147 A | 11/1996 | Mori et al. | |
| 5,677,703 A | 10/1997 | Bhuva et al. | |
| 5,808,797 A | 9/1998 | Bloom et al. | |
| 5,982,553 A | 11/1999 | Bloom et al. | |
| 6,133,986 A | 10/2000 | Johnson | |
| 6,177,980 B1 | 1/2001 | Johnson | |
| 6,476,387 B1 * | 11/2002 | Nishimura et al. ...... 250/306 |
| 6,687,041 B1 | 2/2004 | Sandstrom | |
| 6,747,783 B1 | 6/2004 | Sandstrom | |
| 6,795,169 B2 | 9/2004 | Tanaka et al. | |
| 6,806,897 B2 | 10/2004 | Kataoka et al. | |
| 6,811,953 B2 | 11/2004 | Hatada et al. | |
| 2003/0073260 A1 * | 4/2003 | Corso ................... 438/48 |
| 2004/0041104 A1 | 3/2004 | Liebregts et al. | |
| 2004/0130561 A1 | 7/2004 | Jain | |
| 2005/0007572 A1 | 1/2005 | George et al. | |
| 2006/0030812 A1 * | 2/2006 | Liakopoulos et al. ...... 604/46 |

FOREIGN PATENT DOCUMENTS

WO    WO98/33096    7/1998
WO    WO98/38597    9/1998

* cited by examiner

*Primary Examiner*—Shamim Ahmed
(74) *Attorney, Agent, or Firm*—Sterne, Kessler, Goldstein & Fox P.L.L.C.

(57) ABSTRACT

A method and apparatus for patterning an array of SLM mirrors with a phase step is disclosed. Additional embodiments of the present invention describe a method for processing a substrate, wherein the processed substrate is used in the apparatus for patterning an array of SLM mirrors with a phase step. The processed substrate is then placed in close proximity to the mirrors and the etching/deposition process is then done through openings in the substrate. In embodiments in which the processed substrate does not have a high enough density of openings, a stepping and repeating process is used in order to achieve complete process coverage of every mirror in an array of SLM mirrors.

18 Claims, 15 Drawing Sheets

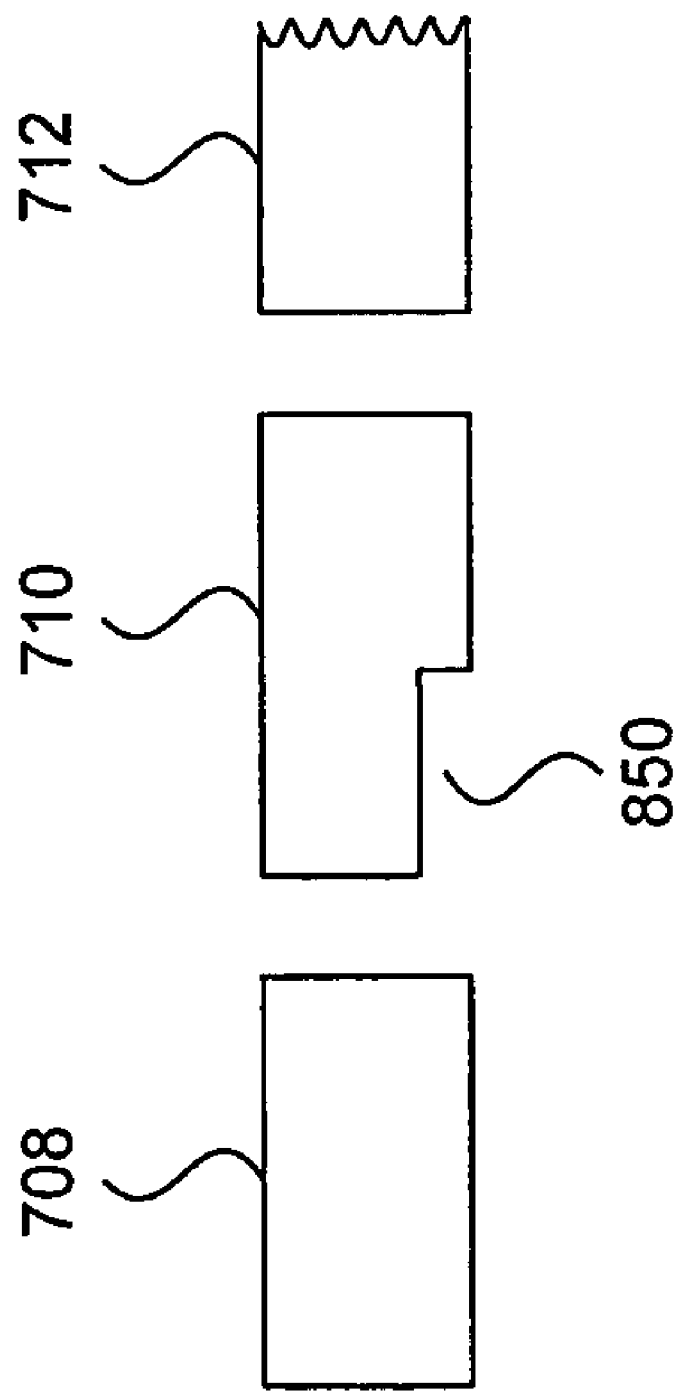

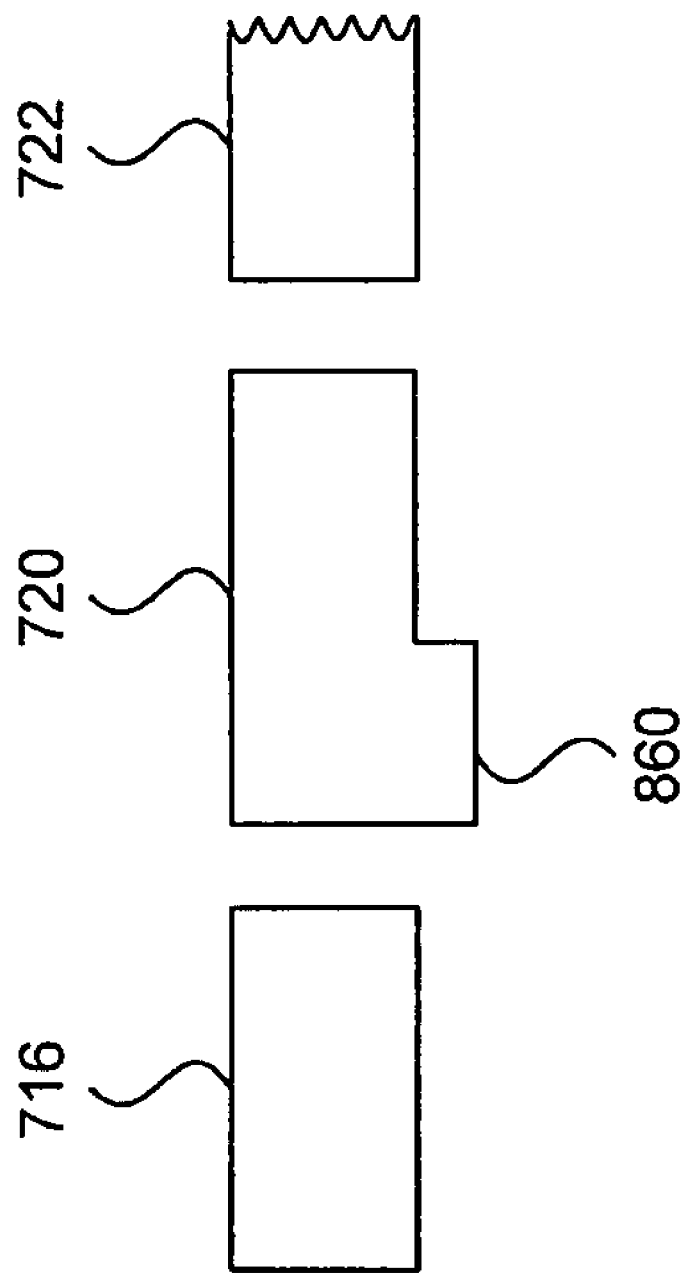

METHOD AND APPARATUS FOR CREATING A PHASE STEP IN MIRRORS USED IN SPATIAL LIGHT MODULATOR ARRAYS

BACKGROUND OF THE INVENTION

1. Field of the Invention

The present invention is related to the processing of light patterning devices.

2. Background Art

A patterning device is used to pattern incoming light. A static patterning device can include reticles or masks. A dynamic patterning device can include an array of individually controllable elements (or, Spatial Light Modulators) that generate a pattern through receipt of analog or digital signals. Example environments for use of the patterning device can be, but are not limited to, a lithographic apparatus, a maskless lithographic apparatus, a projector, a projection display apparatus, or the like.

Currently, arrays of Spatial Light Modulators (SLMs) can comprise various types of mirrors, including pistoning mirrors, tilting mirrors and tilting phase step mirrors.

Pistoning mirrors have a pure phase modulation effect, but amplitude modulation can also be obtained by combining piston mirrors into one large pixel. This results in a loss of resolution as well as limits the ability in replicating the effect of assist features (e.g., features intended to improve lithography on a customer wafer, for example, optical proximity correction features, serifs, hammerheads, scattering bars, anti-scattering bars, etc.) smaller than the largest pixel. There is also significant throughput loss with this approach.

Tilting mirrors are used to produce different amplitudes and/or phases of reflected light at an image plane and/or collected (captured) at projection optics. At different phases, an amplitude of reflected light, as seen at an image plane and/or collected at projection optics, is considered to have positive or negative light intensity. For example, when a mirror is untilted (e.g., resting) light at the image plane and/or collected at projection optics is considered to have a positive intensity with zero phase. During tilting of the mirror, there is a tilt angle at which no light is directed toward the image plane and/or is collected at projection optics, so the amplitude of the light at the image plane goes to zero. Then, as the mirror continues to tilt, out of phase light reaches the image plane and/or is collected at projection optics, which is considered to be negative light intensity or negative amplitude light.

One type of tilting mirror, as discussed above, is a phase step tilting mirror ($\lambda/4$ phase step), for example, proposed by Micronic Laser Systems of Sweden. When at rest a phase step mirror reflects no light to a pupil of a projection system because, due to the step, half the light has a zero degree phase and the other half of the light has a 180 degree phase. As the mirror is tilted, light is captured or collected by the projection system, where a direction of tilt determines the amplitude and/or phase of light that is captured or collected.

Processing phase step tilting mirrors requires at least two steps. First, flat SLM mirrors are created by MEMS techniques. Then, these SLM mirrors have the phase step either etched into the existing surface, or deposited as an increase in thickness by adding material. Applying photoresist and patterning the photo resist layer is not an effective procedure to produce phase steps on an array of SLM mirrors. Since there are gaps between adjacent mirrors in the array, photoresist applied to the entire array will have zones of varying thickness. These thickness defects in the photoresist layer can cause etching or deposition where it is not desired. In addition, there is also a severe yield risk to otherwise functional mirrors due to the wet processing steps involved with the photoresist process.

Therefore, what is needed is a is a method and apparatus for processing an array of SLM mirrors to produce a phase step in respective mirrors in the array.

BRIEF SUMMARY OF THE INVENTION

An embodiment of the present invention provides a method for creating a mask out of a wafer including the following steps. Creating a plurality of cavities on a first major side of the wafer. Patterning a second major side of the wafer with an etch-resistant layer. Etching portions of the wafer not patterned with the etch-resist layer to create openings between the first major side and the second major side of the wafer.

Another embodiment of the present invention provides a method for producing a phase step in a spatial light modulator (SLM) mirror including the following steps. Directing a material towards an array of SLM mirrors, each mirror having an area. Blocking at least a portion of the material from reaching the array of mirrors, such that the material only impinges upon a predetermined portion of the respective areas of given mirrors in the array.

A further embodiment of the present invention provides an apparatus for patterning an SLM mirror comprising a material source and a mask. The material source directs material towards an array of SLM mirrors, wherein each mirror has an area. The mask blocks at least a portion of the material from reaching the array of mirrors, such that the material only impinges upon a predetermined portion of the respective areas of given mirrors in the array.

The present invention provides a method and apparatus in which no photoresist step is involved in processing a phase step on SLM mirrors in an array of SLM mirrors. This lack of a photoresist step removes the risk of leaving residual photoresist in between mirrors or below mirrors where it can cause mirror failure. In addition, the phase step can be processed into the SLM mirrors using dry processing only, if desired.

Further embodiments and features of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 8A shows a phase step etched into one of the mirrors in the array of SLM mirrors, according to an embodiment of the present invention.

FIG. 8B shows a phase step deposited onto one of the mirrors in the array of SLM mirrors, according to an embodiment of the present invention.

Figure 1:
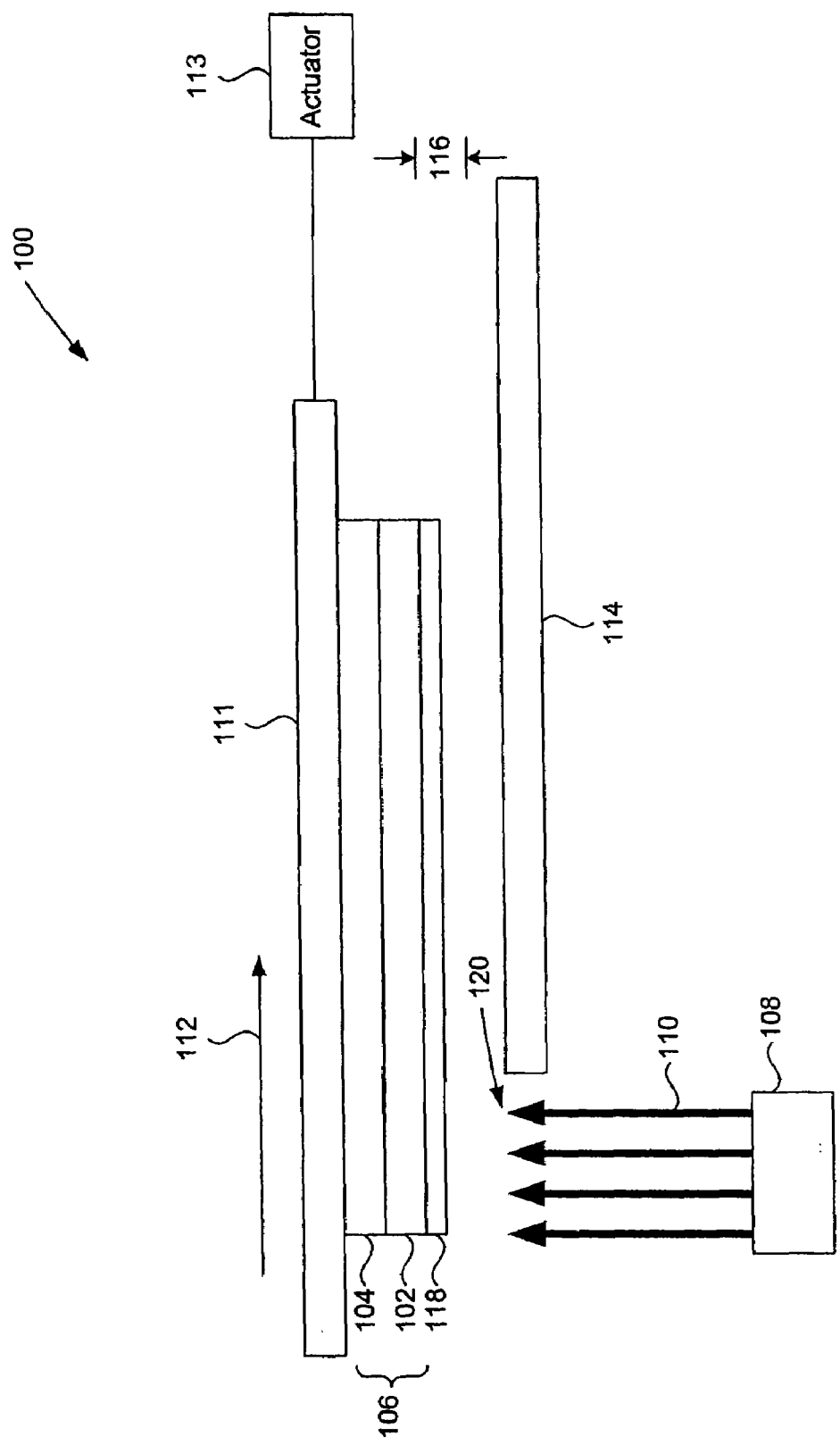
FIG. 1 shows an apparatus that patterns an array of SLM mirrors to produce a phase step in the respective mirrors of the array.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

One or more embodiments of the present invention provide a method and apparatus for patterning an array of SLM mirrors with a phase step.

Additional embodiments of the present invention provide a method for processing a substrate, wherein the processed substrate is used in the apparatus for patterning an array of SLM mirrors with a phase step.

Terminology

Throughout the description, the use of the terms "pattern generator" and "pattern generating device(s)" includes a reflective or transmissive reticle, a contrast device, a liquid crystal display, a spatial light modulator, a grating light valve, a digital mirror device, or any other device that can be used to impart a pattern onto a light beam, as will become apparent to one of ordinary skill in the art upon reading this description.

Also, the use of "system" or "lithography system" is meant to include photolithography, direct write lithography, maskless lithography, immersion lithography, and the like.

Further, the use of "light" or "radiation" is meant to include any wavelength desired for a particular application.

Vapor deposition refers to any process in which materials in a vapor state are condensed through condensation, chemical reaction, or conversion to form a solid material. As known by persons having ordinary skill in the art, these processes are used to form coatings that alter the mechanical, electrical, thermal, optical, corrosion resistance, and/or wear properties of a substrate or layer. They are also used to form free-standing bodies, films, and fibers and to infiltrate fabric to form composite materials. Vapor deposition processes usually take place within a vacuum chamber.

There are two categories of vapor deposition processes: physical vapor deposition (PVD) and chemical vapor deposition (CVD). PVD comprises bombarding a target with a plasma. Material dislodged from the target is deposited on a workpiece (e.g., a substrate). CVD comprises thermally reacting gases in a coating chamber. The product of the chemical reaction is deposited on the substrate. A subcategory of CVD is photo-CVD. Photo-CVD is a process during which a chemical vapor reaction driven by the absorption of radiation occurs and a reaction product is deposited on a layer on a substrate. Thus, further developed techniques can be used in connection with the present invention.

Etching refers to any process in which a flux of particles is used to remove material from a substrate. Ion Beam Etching is a process during which material is sputtered from the surface of a substrate. Reactive Ion Etching removes material from the surface of a substrate by two processes: sputtering and chemical reaction. Consequently, depending on the chemical reaction, Reactive Ion Etching can be used to selectively remove specific materials from the surface of a substrate, as known by persons having ordinary skill in the art.

Overview of Environment for a Contrast Device

As discussed above, during lithography, a substrate, which is disposed on a substrate stage, is exposed to an image (e.g., a pattern) formed by a contrast device, or a plurality (e.g., an array) thereof. The image is projected onto a layer of the substrate by projection optics located within a lithography apparatus. While projection optics are used in the case of lithography, a different type of exposure apparatus can be used depending on the particular application. For example, an excimer laser, x-ray, ion, electron, or photon lithography can each require a different exposure apparatus, as is known to those skilled in the art. The particular example of photolithography is discussed here for illustrative purposes only.

Contrast device are used in lithography systems to pattern light, which forms images that are used to form features on a substrate. Such substrates can include those used in the manufacture of flat panel displays (e.g., liquid crystal displays), circuit boards, integrated circuits, and the like. A frequently used substrate for such applications is a semiconductor wafer or flat panel display substrate (formed of glass, for example). While a portion of this description is written in terms of a semiconductor wafer for illustrative purposes, one skilled in the art would recognize that this description also applies to other types of substrates known to those skilled in the art. Typically, reticles (or masks), spatial light modulators (SLMs) or contrast devices (hereinafter, both are referred to as SLMs), such as digital mirror devices (DMDs), liquid crystal displays (LCDs), grating light valves (GLVs), or the like, or any other elements that include a transmissive and/or reflective pattern can be used as contrast devices.

A dynamic contrast device can include an active area having an n×m (wherein n and m are integers greater than 1) array of active devices (or pixels). For example, active areas can include, but are not limited to, an array of mirrors on a DMD, an array of gratings or ribbons on a GLV, or an array of reflective/transmissive devices on the LCD. Each active device is individually controlled to move the active devices between ON and OFF through one or more discrete states. For example, if the active devices are mirrors on the DMD, each of the mirrors is individually controlled to rotate, tilt, or piston the mirror to either binary or multiple positions. As another example, if the active devices are ribbons in a GLV, sets of ribbons can be deformed or straightened to allow reflection or diffraction of incoming light beams.

It is to be appreciated that controlling the active devices in active areas so that they are partially or fully ON or OFF is well known in the art, and not fully described herein for brevity. Typically, a predetermined and previously stored algorithm based on a desired exposure pattern is used to turn ON (or partially ON) and OFF the active devices, as is known in the relevant arts.

The projected image produces changes in the characteristics of a layer (e.g., photoresist) deposited on the layer of the substrate. These changes correspond to features in the image projected onto the substrate during exposure. Subsequent to exposure, the layer can be processed to modify or create features therein. The features correspond to the pattern projected onto the substrate during exposure. This patterned layer is then used to remove or further process exposed portions of underlying structural layers within the substrate, such as conductive, semiconductive, or insulative layers. This process is then repeated, together with other steps, until the desired structure has been formed.

One type of array of active elements is an array of tilting phase step mirrors ($\lambda/4$ phase step). As described above, tilting phase step mirrors are used to produce different amplitudes and/or phases of reflected light at an image plane and/or collected into projection optics.

The description will now address processing of an array of SLM mirrors itself to form SLM mirrors that have a phase step processed thereon, in accordance with the present invention.

Exemplary Contrast Device Formation Process

FIG. 1 shows a system 100, according to one embodiment of the present invention. In one example, system 100 is a physical vapor deposition (PVD) device comprising a vapor source 108, a holder 111, an actuator 113, and a blocking device 114. In one example, system 100 is used to modify a layer 102 of a substrate 104 of a contrast device 106 supported by holder 111. In one example, layer 102 is a reflective layer of an SLM mirror in an array of SLM mirrors.

A vapor source 108 directs vapors 110 towards layer 102 to alter layer 102. During vapor deposition contrast device 106 is moved in the direction of arrow 112. The moving can be accomplished by coupling substrate 104 to holder 111, which is coupled to actuator 113.

During vapor deposition, a blocking device 114 blocks some of vapor 110 from reaching layer 102. In one example, blocking device 114 can be a mask processed according to a method described below in reference to FIGS. 2-6, in which case, blocking device 114 is made from silicon, molybdenum, or the like. A gap 116 between layer 102 and blocking device 114 is used to control deposition of vapor 110 on layer 102. In an example, gap 116 is minimized to ensure the sharpness of edges in deposition and/or etching processes.

In this embodiment, a portion of layer 102 is exposed to vapor 110 through use of blocking device 114. A thickness profile of a film or coating 118 (hereinafter coating 118) formed when vapors 110 interact with layer 102 can be controlled by a size of an exposure opening (slit) 120 created by blocking device 114, and possibly additionally by a size of gap 116. Thus, in this embodiment, coating of substrate 104 can be done at a desired vapor deposition rate and/or vapor exposure time. In one example, coating 118 is a phase step deposited on the surface of layer 102.

As would become apparent to one of ordinary skill in the art in light of this description, the use of various materials for vapor 110 is contemplated within the scope of the present invention. In one example, vapor 110 can be, but is not limited to, aluminum, or some other reflective material. Thus, coating 118 can be, but is not limited to, aluminum, or some other reflective material. Alternatively, multiple reflective, stacked coating can be formed.

In an alternative example, system 100 is an etching device comprising a etch material source 108, a holder 111, an actuator 113, and a blocking device 114. In this alternative example, system 100 is used to etch a phase step in layer 118 of a substrate 104 of a contrast device 106 supported by holder 111. In one example, layers 102 and 118 are reflective layers of an SLM mirror in an array of SLM mirrors.

A material source 108 directs a material 110 towards layer 118 to etch a phase step in layer 118. As with the deposition process described above, during etching contrast device 106 is moved in the direction of arrow 112. The moving can be accomplished by coupling substrate 104 to holder 111, which is coupled to actuator 113.

During etching, a blocking device 114 blocks some of material 110 from reaching layer 118. In one example, blocking device 114 can be a mask processed according to a method described below in reference to FIGS. 2-6, in which case, blocking device 114 is made from silicon, molybdenum, or the like. A gap 116 between layer 102 and blocking device 114 is used to control deposition of vapor 110 on layer 102.

In this embodiment, a portion of layer 118 is exposed to material 110 through use of blocking device 114. A thickness profile of a phase step (not shown) etched into layer 118 can be controlled by a size of an exposure opening (slit) 120 created by blocking device 114, and possibly additionally by altering the material 110 used in the etching process.

The discussion will now address a method that is used to process a wafer into a mask to be used as the blocking device 114 in system 100, according to an embodiment of the present invention. This process is described in detail with reference to FIGS. 2-5, each of which show side views of a wafer at various stages during the processing of the wafer into a mask.

Exemplary Process for Mask Fabrication

Figure 2:
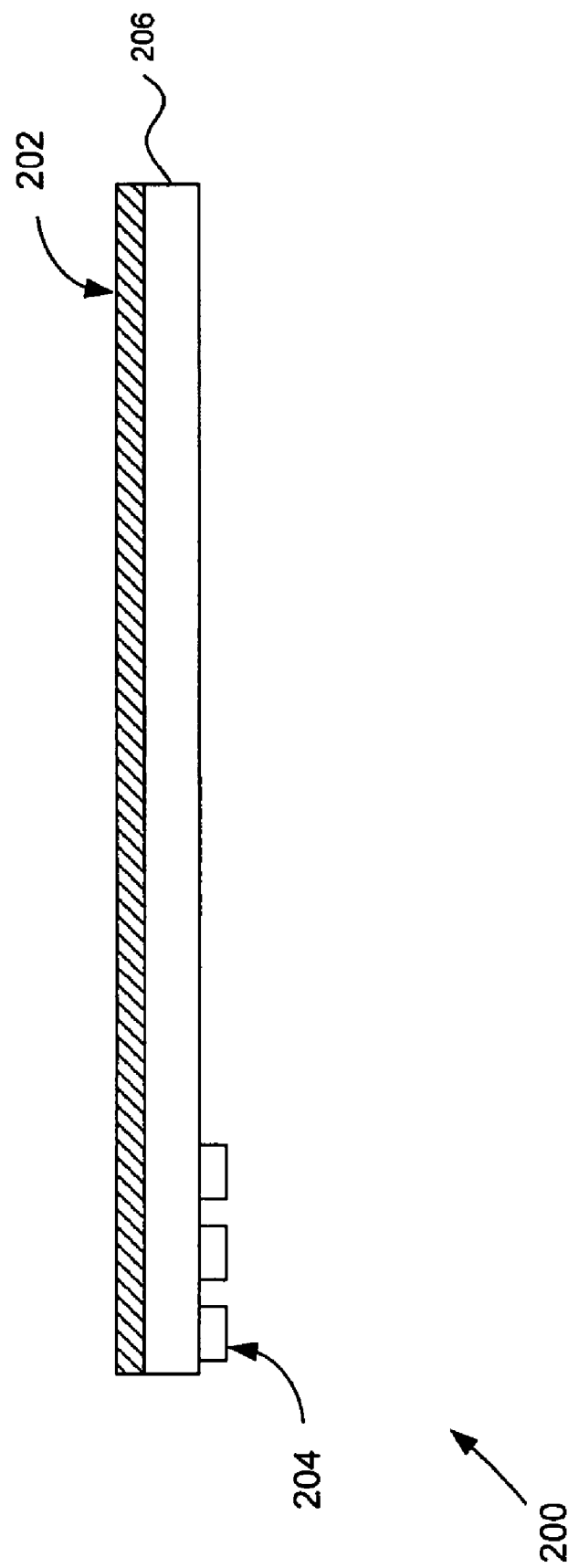
FIG. 2 shows a side view of a wafer that is patterned with etch-resistant layers in preparation for anisotropic etching, according to an embodiment of the present invention.

FIG. 2 shows a substrate that is patterned so that cavities can be etched therein. According to an embodiment of the present invention, a first major side of a wafer 206 is processed to form a smooth layer of etch-resistant material 202, and a second major side of the wafer 206 is patterned with regions of etch-resistant material 204. The etch-resistant material can be, but is not limited to, silicon dioxide, silicon nitride, p++doped silicon, or the like. It is to be appreciated that etch-resistant material 202 can be different than etch-resistant material 204. Anisotropic etch techniques are then used to etch cavities into the second major side of the wafer 206.

Figure 3:
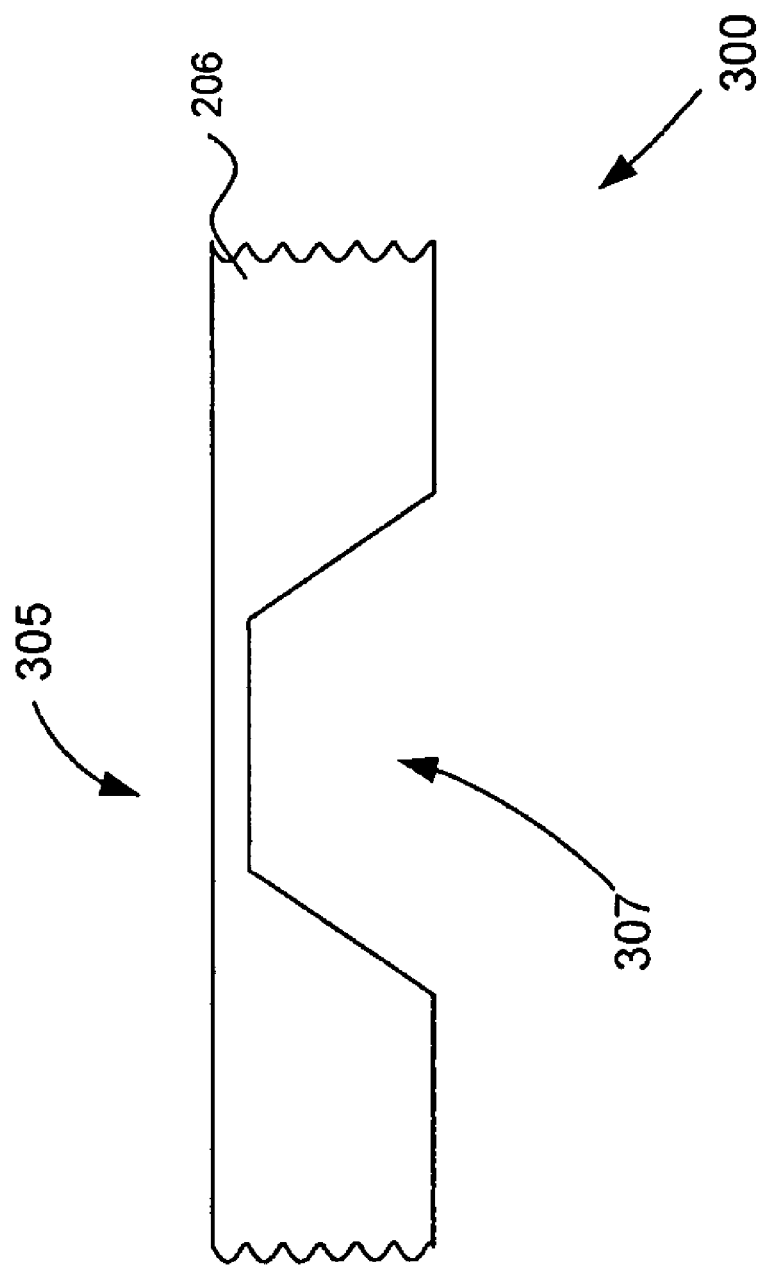
FIG. 3 shows a side view of a wafer in which a cavity has been etched by using anisotropic etching techniques, according to an embodiment of the present invention.

FIG. 3 shows a cavity 307 formed where wafer material remains above the etched region, as depicted by arrow 305. According to the present invention, the accuracy of the cavity etching is not critical.

Figure 4:
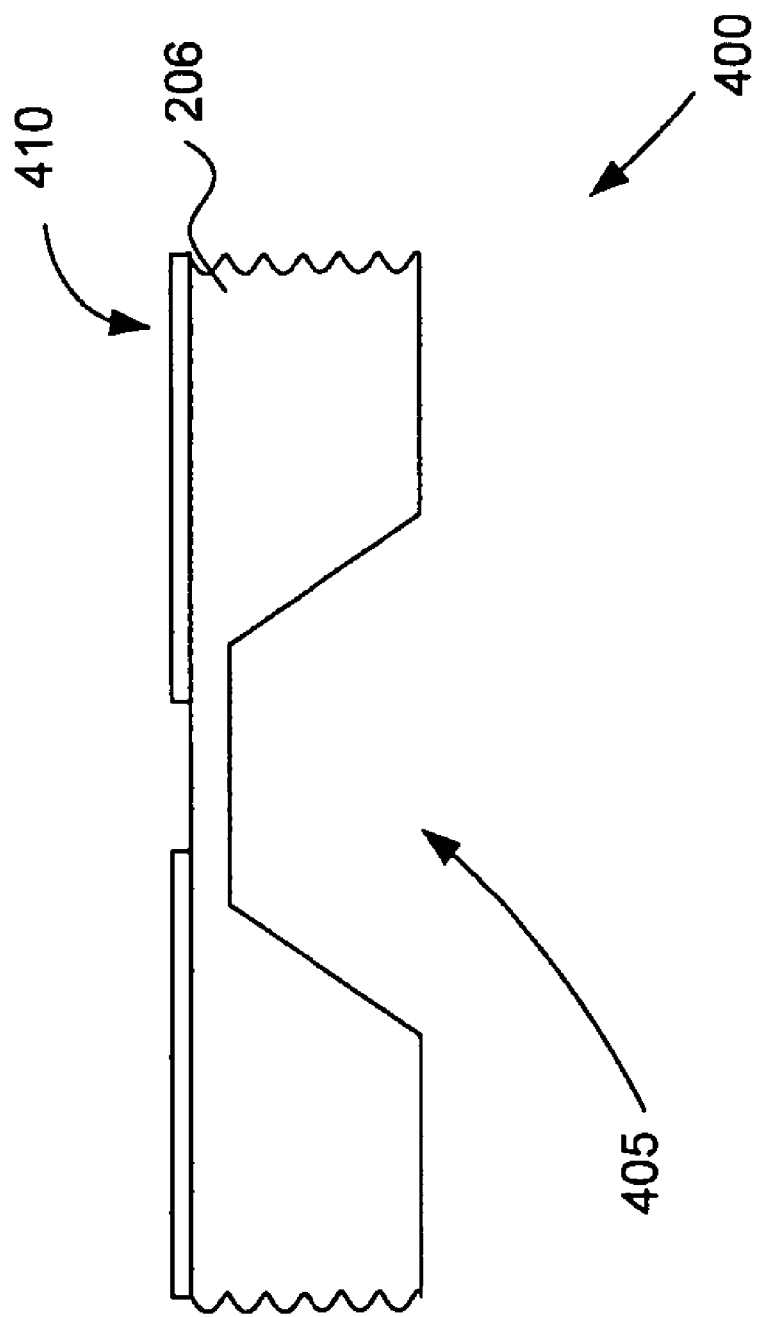
FIG. 4 shows a side view of the wafer of FIG. 3, wherein an etch-resistance layer is patterned on the flat side of the wafer.

FIG. 4 shows the flat side of wafer 206 patterned with an etch-resistant layer 410, which is done with a high accuracy lithography step. Regions that are not patterned with etch-resistant layer 410 must be nominally centered with cavity 405, as shown in FIG. 4. Openings are then etched into wafer 206 at the non-patterned region.

Figure 5:
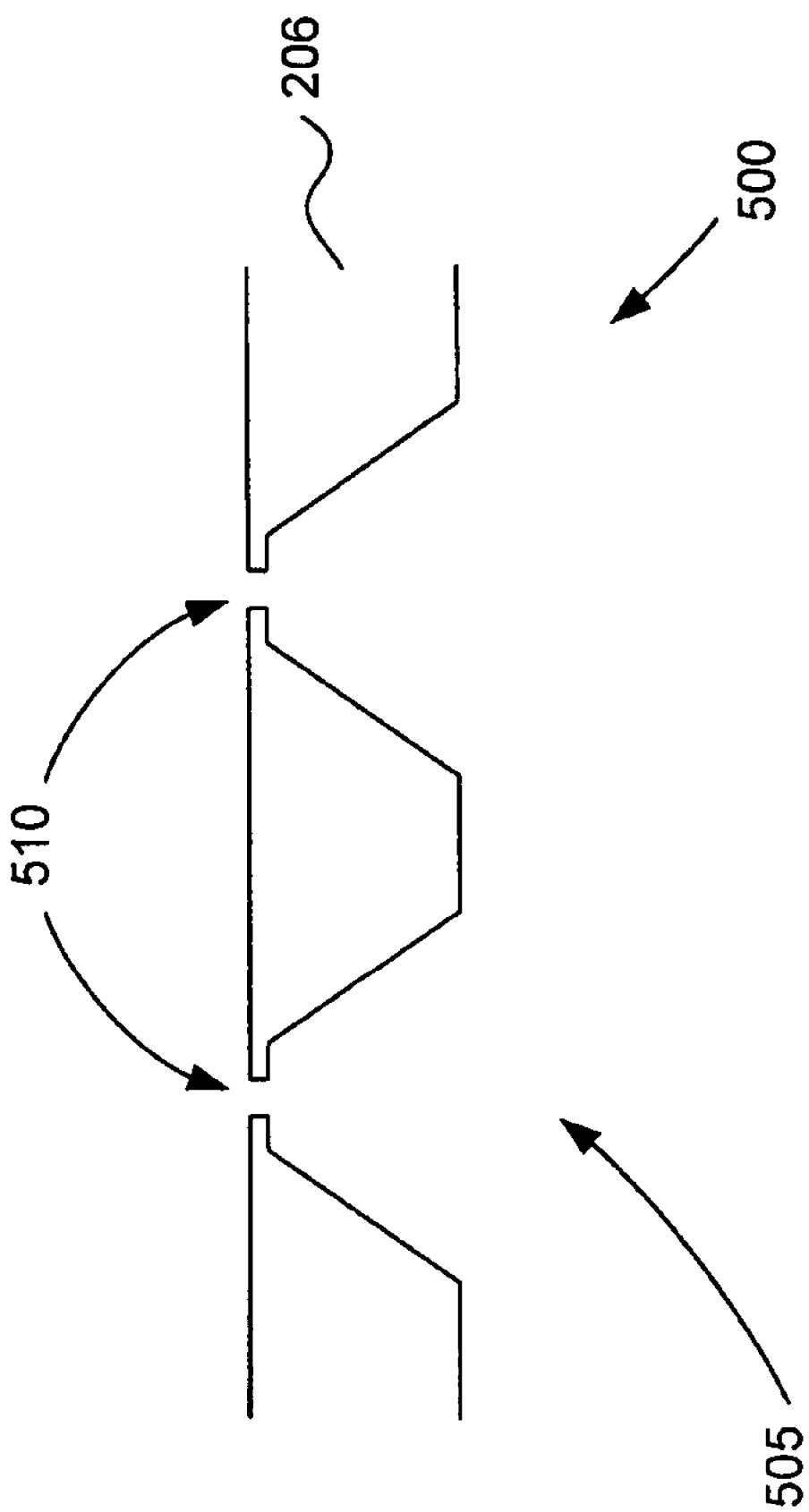
FIG. 5 shows a side view of the wafer of FIG. 4, wherein openings have been etched in the wafer.

FIG. 5 shows wafer 206 with openings 510 etched therein. After the openings are etched into wafer 206, the etch-resistant layer 410 is optionally removed using stripping techniques known to persons skilled in the relevant art. Typical dimensions of wafers etched in this manner are herein discussed below with reference to FIG. 10.

Figure 6:
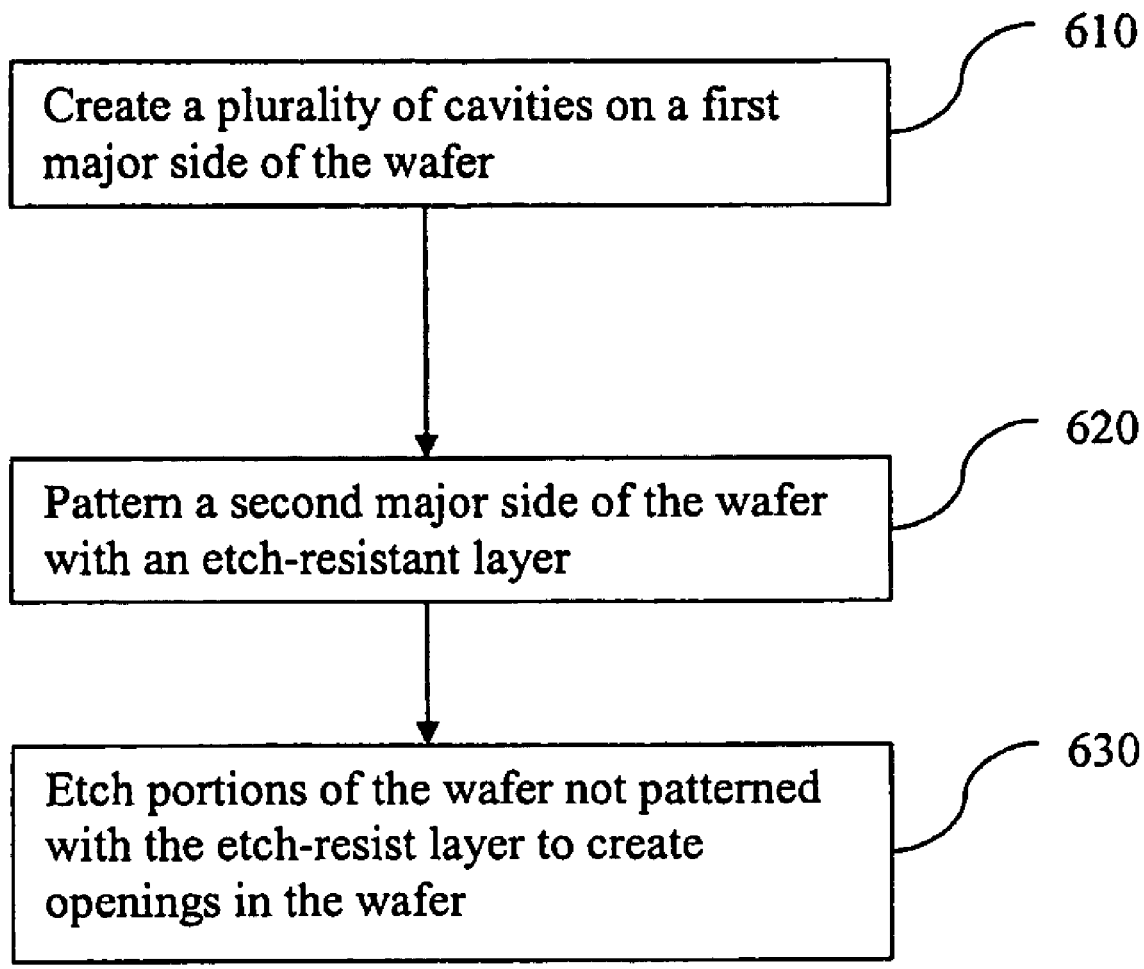
FIG. 6 is a flowchart depicting a method for creating a mask out of a wafer, according to an embodiment of the present invention.

FIG. 6 is a flowchart depicting a method, according to one embodiment of the present invention. The method can be used to create a mask out of a wafer, in accordance with FIGS. 2-5, or other operations as would become apparent to one of ordinary skill in the art in light of this description.

In step 610, a plurality of cavities are etched into a first major side of a wafer. In step 620, an etch-resistant layer is patterned on a second major side of the wafer aligned to the plurality of cavities. In step 630, portions of the wafer that were not patterned with the etch-resistant layer in step 620 are etched to create openings between the first and second major sides of the wafer.

Next the discussion switches to address methods in which a mask created according to FIG. 6 can be used as the blocking device 114 in system 100 to create a phase step in a mirror in an array of SLM mirrors.

First Exemplary Operation of Mask: Processing a Single SLM Mirror

Figure 7:
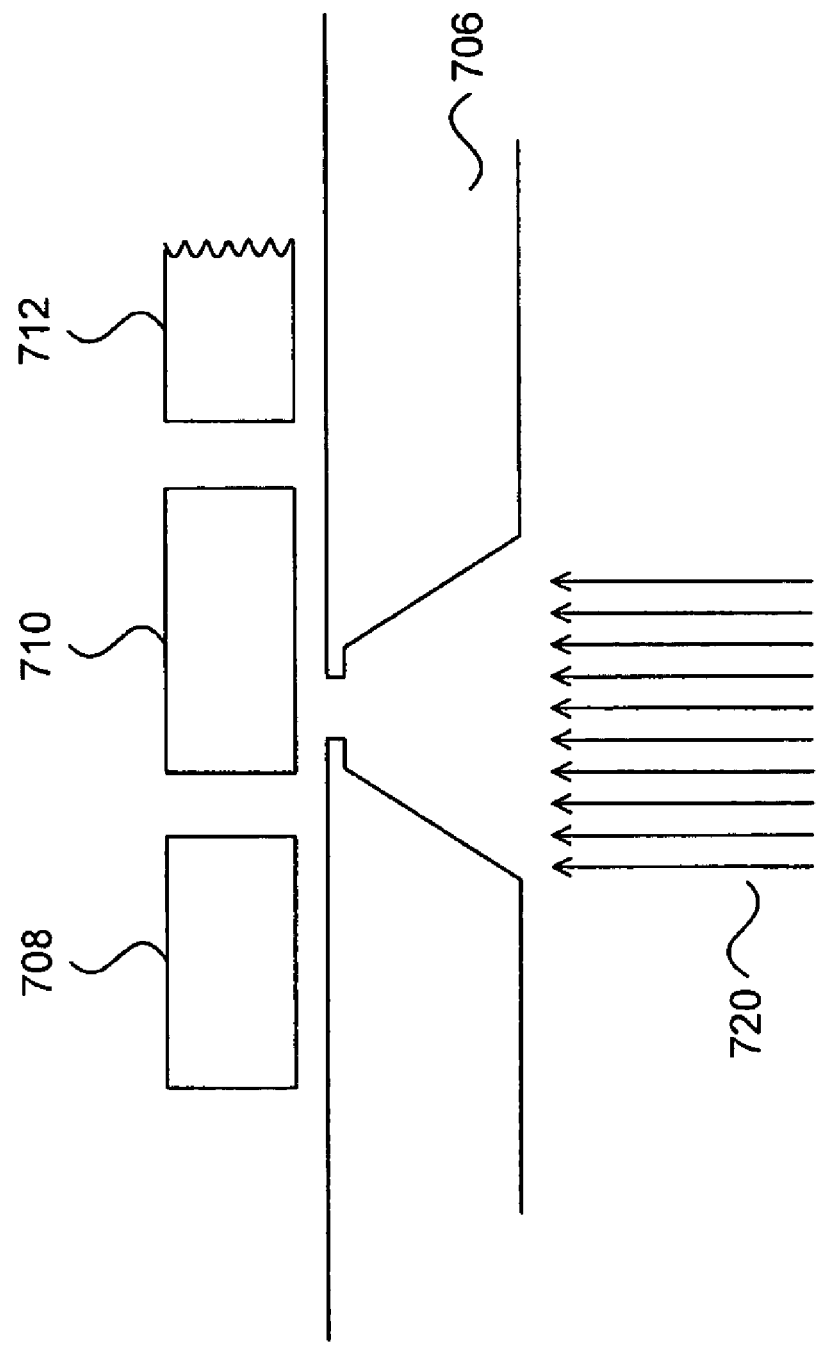
FIG. 7 shows a side view of a mask being used to produce a phase step in a mirror in an array of SLM mirrors, according to an embodiment of the present invention.

FIG. 7 shows a side view of a mask used in close proximity to an array of SLM mirrors. The figure shows a flux of material 720 directed toward an array of SLM mirrors 708, 710 and 712. Mask 706 blocks a portion of the flux of material 720 so that only a predetermined portion of the area of mirror 710 is impinged upon by material 720. The material that impinges upon mirror 710 is used to produce a phase step in mirror 710.

Material 720 can be etch particles, wherein the etch particles etch a phase step into mirror 710. The etching can be achieved by, but is not limited to, Reactive Ion Etching or Ion Beam Etching. Alternatively, material 720 can be deposition particles, wherein a phase step is deposited onto mirror 710. The deposition step can be achieved by, but is not limited to, sputter deposition, physical vapor deposition, chemical vapor deposition, photo-chemical vapor deposition, or the like. Known etch and deposition techniques compatible with the masking technique of the present invention will become apparent to persons having ordinary skilled in the art.

FIG. 8A shows a phase step 850 etched into mirror 710. In this example, phase step 850 is approximately half the width of mirror 710. Alternative to etching, a phase step could be deposited on mirror 710. It should be apparent to one skilled in the art that if deposition was used rather than etching, the phase step would be higher, not lower (as depicted in FIG. 8) than the nominal plane of the SLM mirror. For example, FIG. 8B shows a phase step 860 deposited onto mirror 720.

It is to be appreciated that the dimensions in FIGS. 8A and 8B are not necessarily drawn to scale. For example, a width and/or a height of phase step 850 or phase step 860 can be longer or shorter than that shown in the figures.

Figure 9:
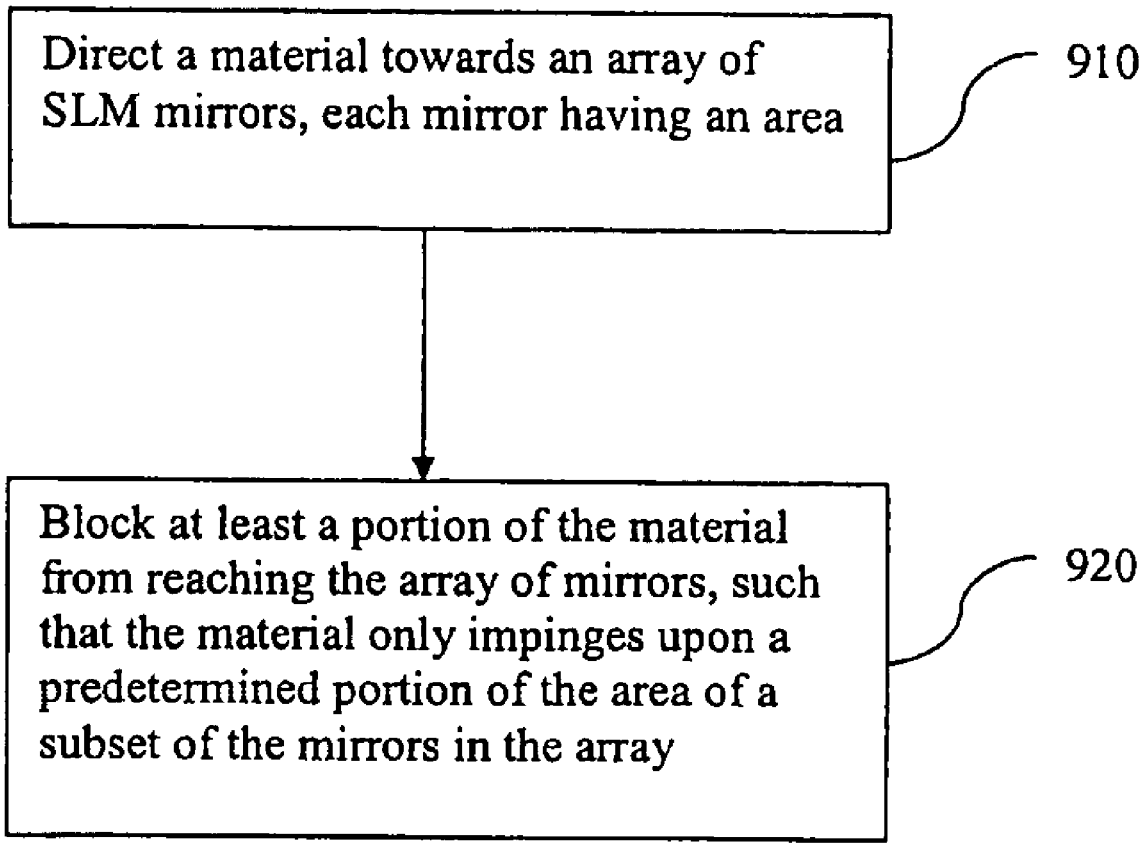
FIG. 9 is a flowchart depicting a method for producing a phase step in an SLM mirror, according to an embodiment of the present invention.

FIG. 9 is a flowchart depicting a method according to an embodiment of the present invention. The method can be used to create a phase step in a mirror in an array of SLM mirrors. In step 910, a material is directed toward an array of SLM mirrors, wherein each mirror has an area. In step 920, at least a portion of the material is blocked from reaching the array of mirrors, such that the material only impinges upon a predetermined portion of the area of a subset of the mirrors in the array.

In an example of the method depicted in FIG. 9, a mask, as fabricated according to the method depicted in FIG. 6, can be used as the device that does the blocking in step 920. The mask can be made of, but is not limited to, silicon, molybdenum, or the like.

The relative dimensions of the SLM mirrors and the mask processed according to the method described in reference to FIG. 6 can affect the processing of the SLM mirrors. In particular, the mask processed according to the preferred embodiment described above does not have a high enough density of openings to process all the SLM mirrors in an array of SLM mirrors at the same time. The discussion now addresses a method for stepping and repeating the process in order to achieve complete process coverage of the SLM array.

Second Exemplary Operation of Mask: Processing an Array of SLM Mirrors

Figure 10:
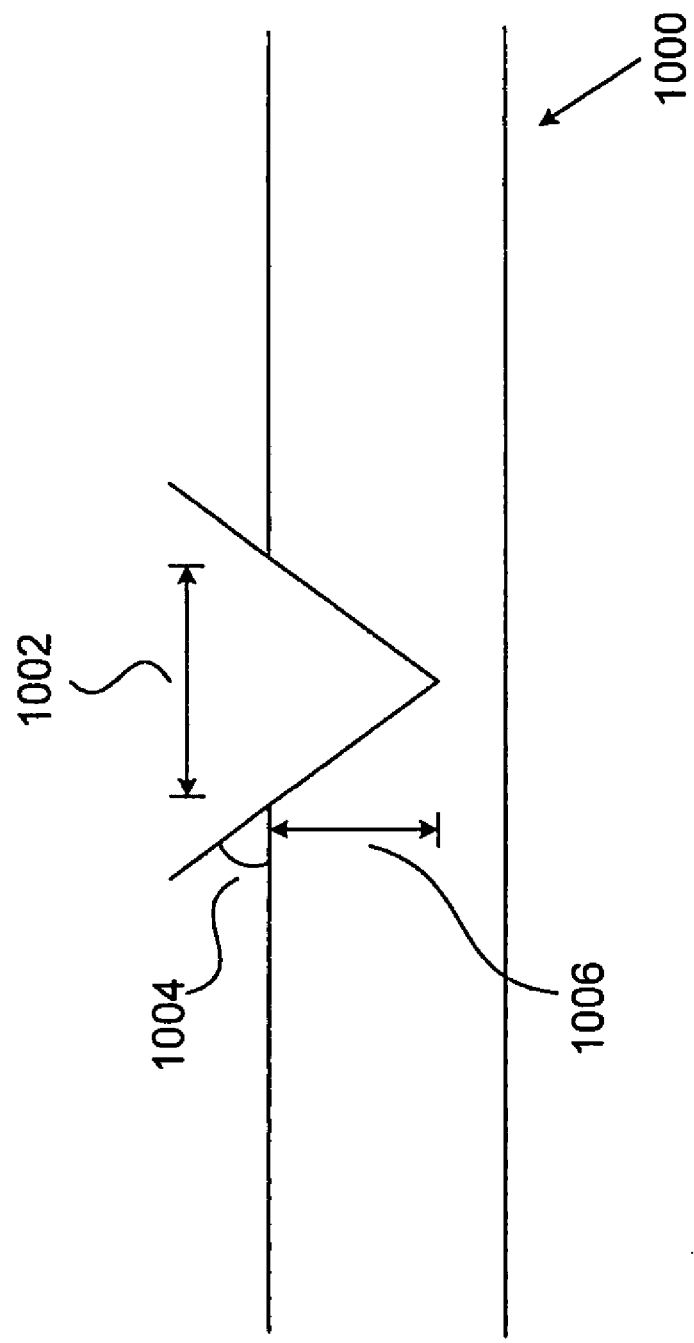
FIG. 10 is a side view of the typical geometry of silicon wafer etching.

FIG. 10 shows a side view of the typical geometry of anisotropic etching of wafers. In the figure, a cavity is etched into wafer 1000. The cavity etched in wafer 1000 has a width 1002 and a depth 1006. In addition, an inclination of the cavity makes an angle 1004 with a surface of wafer 1000.

Dimensions for width 1002, depth 1006, and angle 1004 are described below. The specific dimensions are discussed for explanatory purposes, and not limitation. The skilled artisan will appreciate that the below-described method is not dependent on the specific dimensions. Embodiments having dimensions other than the specific values below-described are contemplated within the scope of the present invention.

In an embodiment of the present invention, the width 1002 of the cavity is approximately 0.1 to 1 mm. In a preferred embodiment, width 1002 is approximately 0.42 mm. The depth 1006 of the cavity is approximately 0.3 mm. Angle 1004 is approximately 54.74 degrees.

Figure 11:
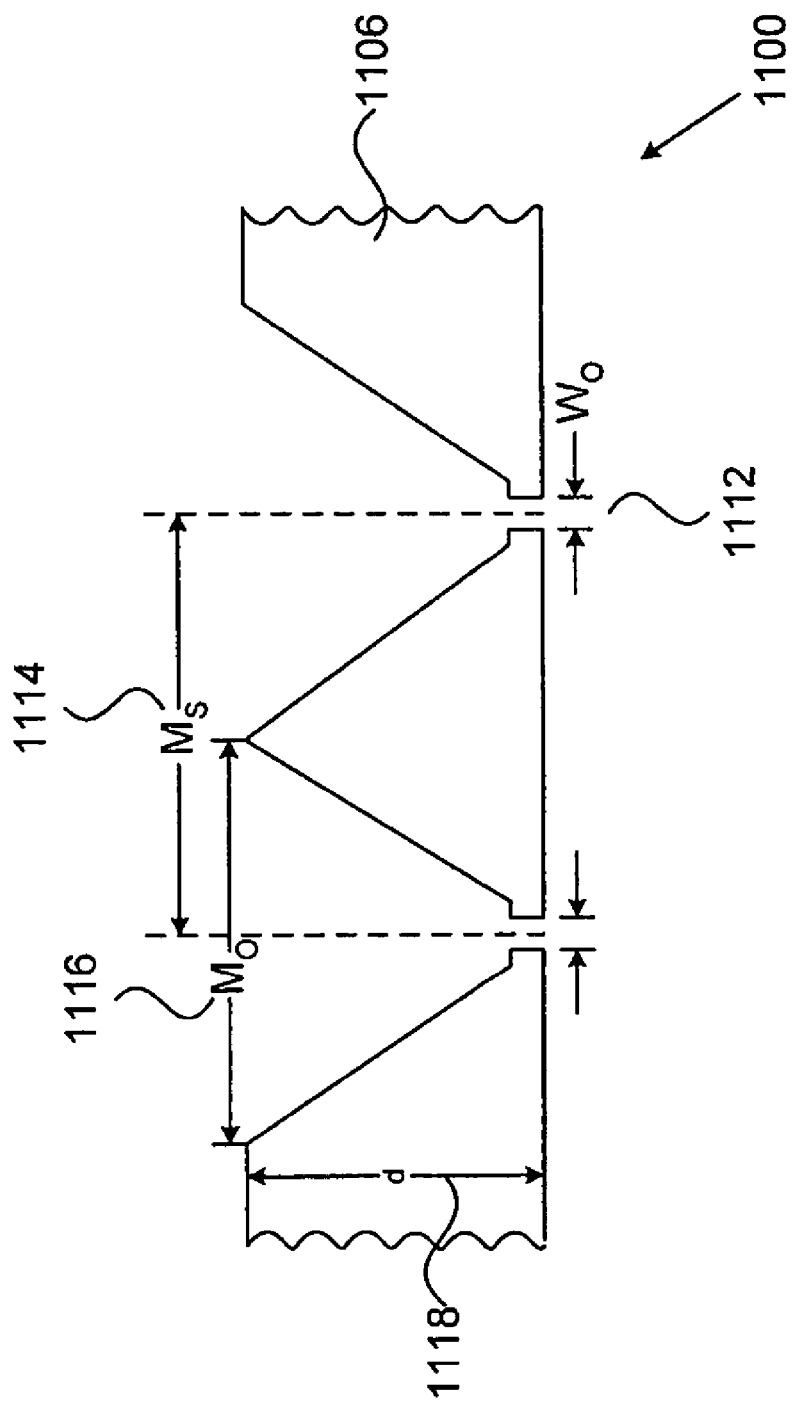
FIG. 11 is a side view of the typical geometry of a silicon wafer in which openings have been etched.

FIG. 11 shows a side view of anisotropically etched wafer in which openings 1112 have been etched, according to the method hereinabove described with reference to FIGS. 2-6. In an embodiment, the width of the openings 1112 are approximately 2 to 6 μm. In a preferred embodiment, the width of the openings 1112 are approximately 3 μm. The distance between the openings 1114 is determined by the width of the cavities 1116. As described above, in a preferred embodiment the width of the cavities is approximately 0.42 mm. Consequently, the distance between the openings 1114, in a preferred embodiment, is approximately 0.42 mm.

The typical dimensions of an SLM mirror is approximately 8 μm×8 μm, with each mirror being densely packed on an array. Since the space between openings, in a preferred embodiment, is approximately 0.42 mm, each mirror in an SLM array cannot be patterned with a stationary mask and a stationary SLM array. To circumvent this problem, according to an embodiment of the present invention, the SLM array of mirrors can be moved in discrete steps so that each mirror in the array can be processed with a phase step.

According to the dimensions discussed above, and assuming a mirror pitch of 8 microns, processing each SLM mirror in an array of SLM mirrors with a phase step requires 70 discrete steps in a first direction and 70 discrete steps in a second direction to fully process every SLM mirror in the array. Alternatively, the number of steps in the first direction can be reduced by using rectangular openings to etch one row of one or more mirrors per opening.

An exemplary method for processing an array of SLM mirrors with the above-described dimensions is discussed with reference to FIG. 12. The specific number of discrete steps is discussed for exemplary purposes only, and not limitation. The skilled artisan will appreciate that the below-described method can be implemented with any number of discrete steps. That is, given a different relative geometry of the mask and array of SLM mirrors the number of discrete steps would be correspondingly different; but this alternative number of discrete steps would still be realized within the scope of the method described below.

Figure 12:
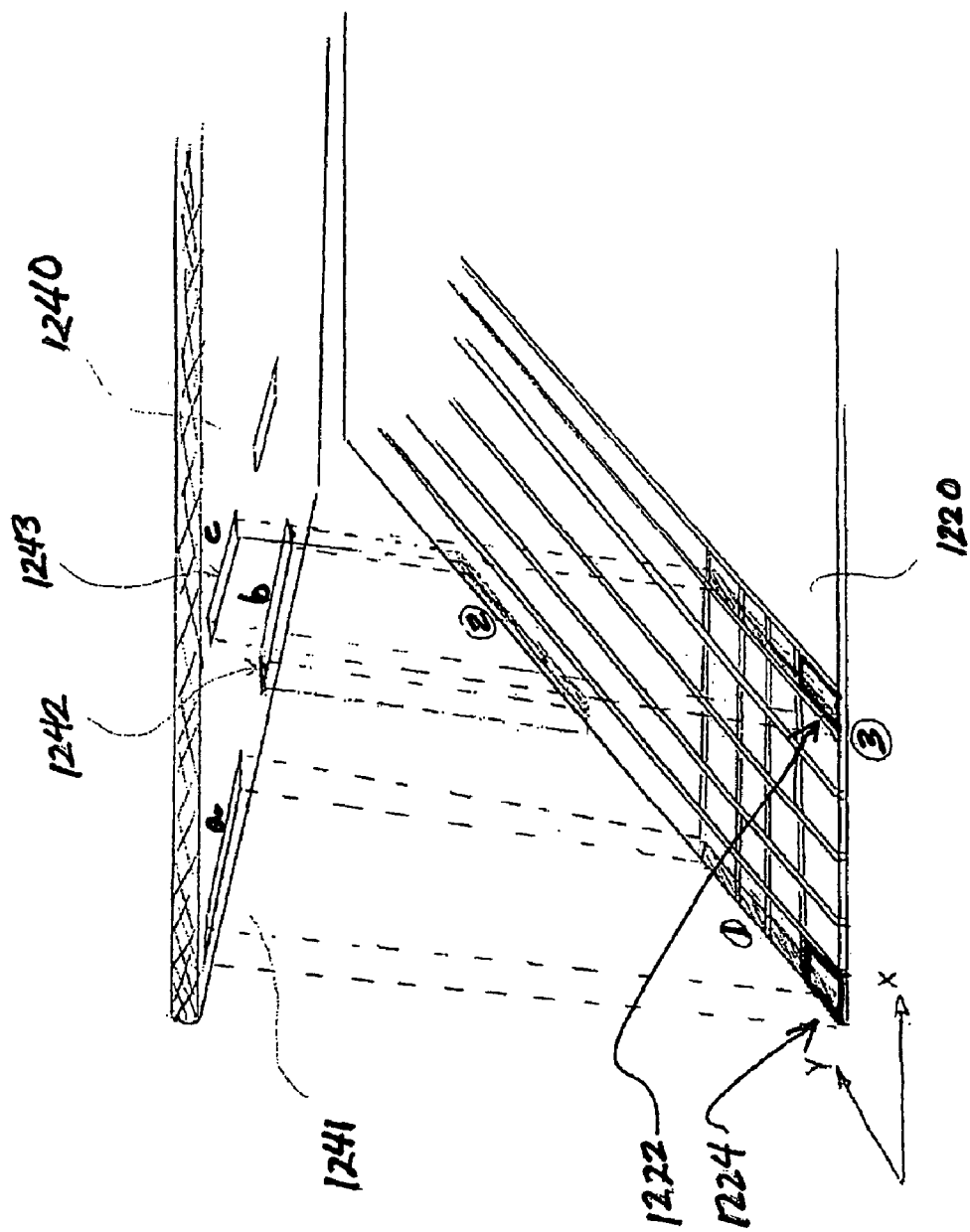
FIG. 12 shows the relative positioning of the openings in the mask in relation to an array of SLM mirrors.

FIG. 12 shows a perspective view of a mask 1240, processed according to the method described in FIG. 6, used in close proximity to an SLM array of mirrors 1220. In the figure, mask 1240 is shown with openings 1241, 1242, and 1243. The width (x direction) of the openings is as wide as the phase step to be processed on the mirror (here shown as ½ the width of the mirror). As seen in the figure, the length of the openings is longer than the length of any one mirror (y direction). The x distance of opening 1243 from opening 1241 is an integer number of mirror widths. For example opening 1241 can be aligned to the mirror at x=1 (shown in the figure as mirror 1224) and the opening 1243 can be aligned to the mirror at row x=71 simultaneously.

It should be noted that in FIG. 12 opening 1243 is aligned with the mirror at row x=6; this is for ease in drawing only. It should be understood that according to an embodiment described above, opening 1243 would be aligned with the mirror at row x=71. It is to be appreciated that x can be any integer value and that all integer values of x are contemplated within the scope of the present invention. For explanatory purposes, and not limitation, the description will continue as if opening 1243 were aligned with the mirror at row x=71 to be consistent with the embodiment described above.)

After processing rows x=(1, 71, 141, . . . ) the mask (or SLM array) is stepped over 1 mirror width to align x=(2, 72, 142, . . . ) to be processed, until all rows have been processed once. A subsequent y direction step aligns opening 1241 with the unprocessed mirrors between area 1201 and 1202 on the SLM array to process those mirrors. Sixty-nine more x steps complete the processing of the array of SLM mirrors.

As above-described, the processing of the SLM mirrors referred to in the discussion of FIG. 12 can include etching or depositing a phase step on the mirrors.

Figure 13:
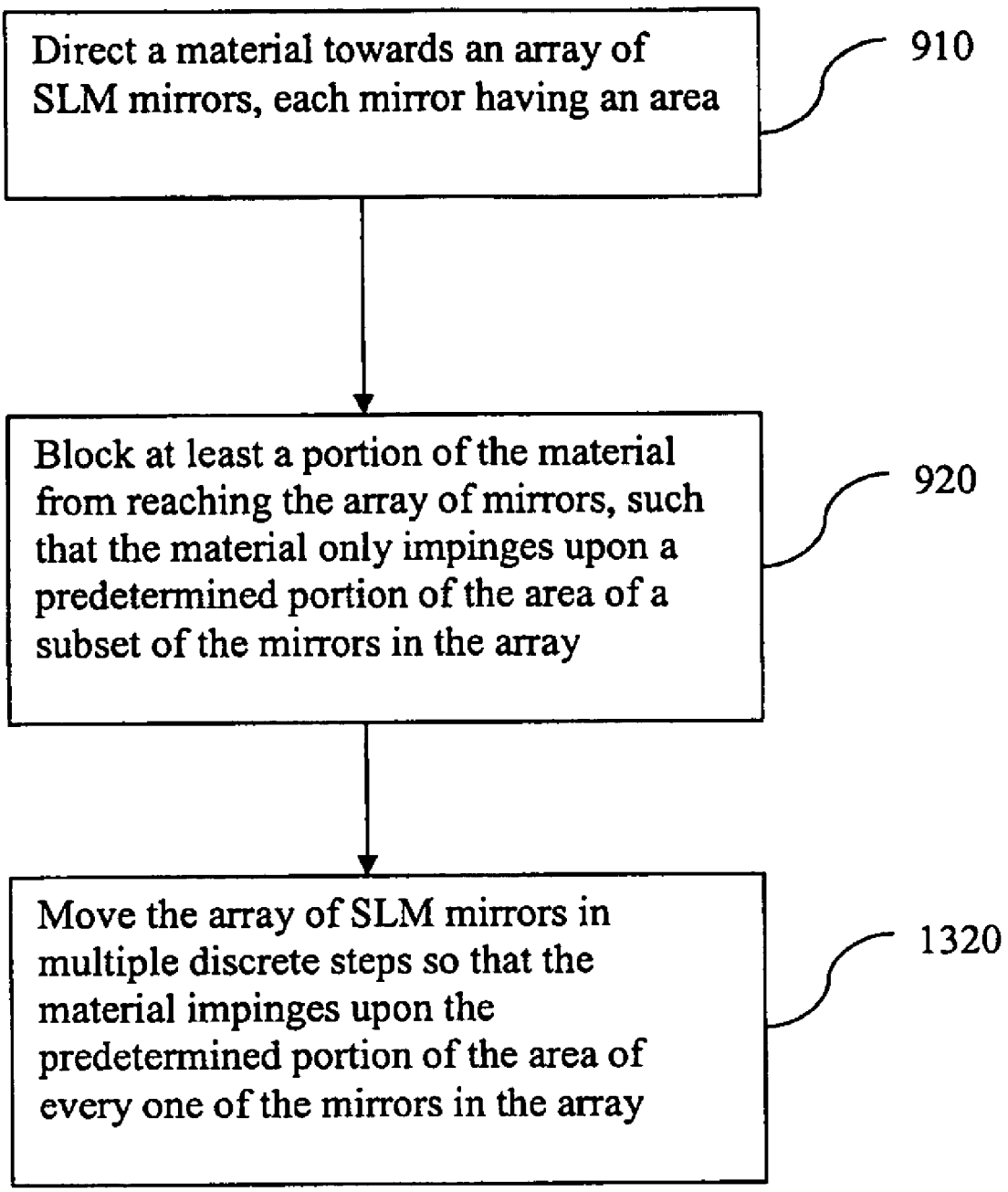
FIG. 13 is a flowchart depicting a method for producing a phase step in every SLM mirrors in an array, according to an embodiment of the present invention.

FIG. 13 is a flowchart depicting a method for stepping the SLM array relative to the mask so that all the mirrors in the array are patterned with a phase step. In step 910, a material is directed towards an array of SLM mirrors, wherein each mirror has an area. In step 920, at least a portion of the material is blocked from reaching the array of mirrors, such that the material only impinges upon a predetermined portion of the area of a subset of the mirrors in the array. In step 1320, the array of SLM mirrors is moved in multiple discrete steps so that the material impinges upon the predetermined portion of the area of every one of the mirrors in the array.

Etching of the mask or deposition of material on the mask can potentially cause problems in the processing of the SLM mirrors. For example, the mask may erode at too high a rate, requiring disposal of the mask once it is worn beyond its tolerance. In a preferred embodiment, a mask material and an etch process with high selectivity are used to provide prolonged durability of the mask during the processing of the array of SLM mirrors. To maximize SLM mirror etching while minimizing mask erosion a suitable reactive ion process is selected, such that the etching ions are much more reactive with the mirror material than the mask material. For example, the etching process can be, but is not limited to, $BCl_3$ plasma etching. $BCl_3$ plasma etching of aluminum is more than three times faster than the same chemical etch rate of silicon dioxide or silicon nitride. See "Reactive Ion Etch Recipes for Failure Analysis," by David S. Kiefer, Motorola, Inc., ASIC Division, Chandler, AZ (http://www.marchplasma.com/recipes.htm).

Figure 14:
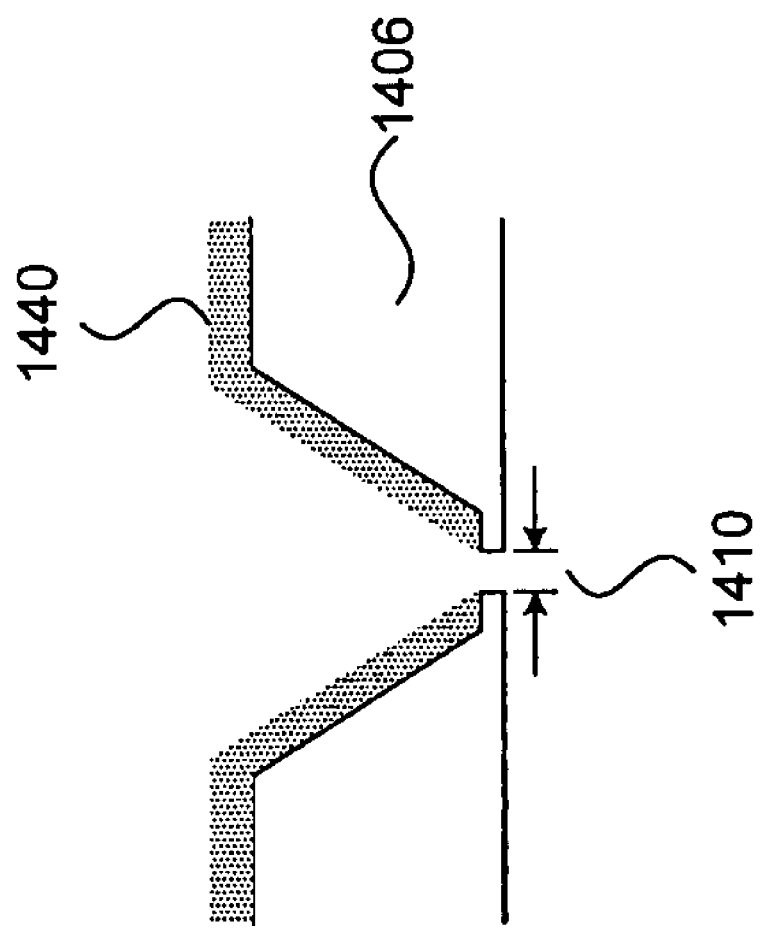
FIG. 14 is a side view of a deposition profile on a mask formed during the method described in FIG. 13.

As an alternative example, material deposited on the mask can obstruct the opening, which can diminish the functionality of the mask. FIG. 14 shows a side view of a mask with a build up of material incurred during deposition processing of an array of SLM mirrors, according to the method discussed in FIG. 13. In deposition processing, the mirror material 1440 deposited through the opening 1410 of the mask 1406 is also deposited on the mask. In a preferred embodiment, the rate of deposition is approximately 48 nm of mirror material per discrete step described in the method of FIG. 13. After a number of steps the hole size is impacted and the mask has to be exchanged or cleaned before processing of the array of SLM mirrors can continue. Cleaning the deposited material from the mask can be done by using a selective wet etchant to remove the mirror material while not etching the mask in order to reclaim the mask.

The mask, in both the deposition and etching processes, is made much larger than the array of SLM mirrors. For example, the diameter of the mask could be approximately 6 inches, 8 inches, or 12 inches; whereas the dimension of the array of SLM mirrors could be approximately 25 mm×40 mm. By using masks that are much larger than the array of SLM mirrors, coated or worn areas of the mask can be moved aside. Then active areas still having openings within specifications can be positioned over the subsequent mirrors to achieve a fully processed array of SLM mirrors in one sequence of steps without a mask exchange. Since deposited mirror material can be removed from the mask, if the mask is to be recycled, a deposition process is preferred over an etching process.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for manufacturing a spatial light modulator (SLM) mirror, comprising:

(a) creating a plurality of cavities on a first major side of a wafer;

(b) patterning a second major side of the wafer with an etch-resistant layer;

(c) etching portions of the wafer not patterned with the etch-resist layer to create openings between the first major side and the second major side of the wafer; and (d) passing a material through a first opening in the wafer to cause the material to impinge upon a predetermined area of the SLM mirror that is aligned with the first opening, wherein the material causes a phase step to form on the SLM mirror.

2. The method of claim 1, wherein step (a) comprises: creating a plurality of cavities, each cavity having a width of approximately 0.1 millimeters to 1 millimeters.

3. The method of claim 1, wherein step (a) comprises: creating a plurality of cavities, each cavity having a width of approximately 0.42 millimeters.

4. The method of claim 1, wherein step (c) comprises: etching openings in the wafer, each opening having a width of approximately 2 micrometers to 6 micrometers.

5. The method of claim 1, wherein step (c) comprises: etching openings in the wafer, each opening having a width of approximately 3 micrometers.

6. The method of claim 1, wherein step (a) comprises: anisotropically etching the first major side of the wafer.

7. The method of claim 1, wherein step (a) comprises creating a plurality of cavities on the first major side of the wafer, wherein the wafer comprises one of a silicon wafer and a molybdenum wafer.

8. The method of claim 1, wherein step (d) comprises etching a phase step in the mirrors by using one of an ion beam and a reactive ion beam as the material that impinges upon the predetermined area of the SLM mirror.

9. The method of claim 8, wherein the reactive ion beam is substantially more reactive with a reflective coating of the SLM mirror than the wafer.

10. The method of claim 1, wherein step (d) comprises depositing a phase step on the SLM mirror by using aluminum as the material that impinges upon the SLM mirror.

11. The method of claim 1, wherein the SLM mirror is one of a plurality of SLM mirrors included in an array of SLM mirrors, the method further comprising:

(e) moving the array of SLM mirrors in discrete steps along a first direction; and (f) at each discrete step, passing the material through the first opening in the wafer to cause the material to impinge upon a predetermined area of another SLM mirror in the array of SLM mirrors that is aligned with the first opening, wherein the material causes a phase step to form on the other SLM mirror aligned with the first opening.

12. A method for manufacturing a spatial light modulator (SLM) mirror, comprising:

(a) providing a mask having a plurality of openings formed therein; and (b) passing a material through a first opening in the mask to cause the material to impinge upon a predetermined area of the SLM mirror that is aligned with the first opening, wherein the material causes a phase step to form on the SLM mirror.

13. The method of claim 12, wherein step (b) comprises etching a phase step in the SLM mirror by using one of an ion beam and a reactive ion beam as the material that impinges upon the SLM mirror.

14. The method of claim 13, wherein the reactive ion beam is substantially more reactive with a reflective coating of the SLM mirror than the mask.

15. The method of claim 12, wherein step (b) comprises depositing a phase step on the SLM mirror by using aluminum as the material that impinges upon the SLM mirror.

16. The method of claim 12, wherein the SLM mirror is one of a plurality of SLM mirrors included in an array of SLM mirrors, the method further comprising:

(c) moving the array of SLM mirrors in discrete steps along a first direction; and (d) at each discrete step, passing the material through the first opening in the mask to cause the material to impinge upon a predetermined area of another SLM mirror in the array of SLM mirrors that is aligned with the first opening, wherein the material causes a phase step to form on the other SLM mirror aligned with the first opening.

17. The method of claim 12, wherein the SLM mirror is one of a plurality of SLM mirrors included in an array of SLM mirrors, the method further comprising:

(c) moving the mask in discrete steps along a first direction; and (d) at each discrete step, passing the material through the first opening in the mask to cause the material to impinge upon a predetermined area of another SLM mirror in the array of SLM mirrors that is aligned with the first opening, wherein the material causes a phase step to form on the other SLM mirror aligned with the first opening.

18. The method of claim 1, wherein the SLM mirror is one of a plurality of SLM mirrors included in an array of SLM mirrors, the method further comprising:

(e) moving the wafer in discrete steps along a first direction; and (d) at each discrete step, passing the material through the first opening in the wafer to cause the material to impinge upon a predetermined area of another SLM mirror in the array of SLM mirrors that is aligned with the first opening, wherein the material causes a phase step to form on the other SLM mirror aligned with the first opening.

* * * * *